US010099700B2

(12) United States Patent
Prakah-Asante et al.

(10) Patent No.: US 10,099,700 B2
(45) Date of Patent: Oct. 16, 2018

(54) METHOD AND SYSTEM FOR DRIVER TAILORED INTERACTION TIME ALERT

(71) Applicant: Ford Global Technologies, LLC, Dearborn, MI (US)

(72) Inventors: Kwaku O. Prakah-Asante, Commerce Township, MI (US); Hsin-hsiang Yang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 14/265,526

(22) Filed: Apr. 30, 2014

(65) Prior Publication Data

US 2015/0314791 A1 Nov. 5, 2015

(51) Int. Cl.
| | |
|---|---|
| B60K 28/02 | (2006.01) |
| B60W 40/08 | (2012.01) |
| B60W 40/09 | (2012.01) |
| B60R 16/037 | (2006.01) |
| B60W 50/14 | (2012.01) |
| B60R 25/33 | (2013.01) |

(52) U.S. Cl.
CPC ........... *B60W 40/09* (2013.01); *B60R 16/037* (2013.01); *B60R 25/33* (2013.01); *B60W 50/14* (2013.01); *B60W 2050/143* (2013.01); *B60W 2540/30* (2013.01)

(58) Field of Classification Search
None
See application file for complete search history.

(56) References Cited

U.S. PATENT DOCUMENTS

| | | | |
|---|---|---|---|
| 4,797,671 A | 1/1989 | Toal, Jr. | |
| 4,804,937 A | 2/1989 | Barbiaux | |
| 5,355,511 A | 10/1994 | Hatano et al. | |
| 5,432,841 A | 7/1995 | Rimer | |
| 5,633,484 A | 5/1997 | Zancho et al. | |
| 5,654,686 A | 8/1997 | Geschke et al. | |
| 5,732,074 A | 3/1998 | Spaur et al. | |

(Continued)

FOREIGN PATENT DOCUMENTS

| | | |
|---|---|---|
| DE | 10141439 | 2/2003 |
| DE | 10225787 | 12/2003 |

(Continued)

OTHER PUBLICATIONS

Chinese Office Action, FMC 2913 PUS1 Family, dated Mar. 4, 2013.

(Continued)

*Primary Examiner* — Thomas G Black
*Assistant Examiner* — Demetra R Smith-Stewart
(74) *Attorney, Agent, or Firm* — Jennifer Stec; Brooks Kushman P.C.

(57) ABSTRACT

A vehicle comprising at least one controller in communication with a transceiver, and the transceiver capable of communication with one or more infotainment features. The at least one controller may be configured to receive a configurable constraint for the one or more infotainment devices. The at least one controller may be further configured to monitor an interaction between a driver and the one or more infotainment devices based on the configurable constraint. The at least one controller may be further configured to generate an alert if the configurable constraint is exceeded in the interaction.

8 Claims, 5 Drawing Sheets

(56) References Cited

U.S. PATENT DOCUMENTS

| | | |
|---|---|---|
| 5,758,300 A | 5/1998 | Abe |
| 5,889,468 A | 4/1999 | Banga |
| 5,942,979 A | 8/1999 | Luppino |
| 5,943,206 A | 8/1999 | Crayford |
| 5,963,129 A | 10/1999 | Warner |
| 5,986,543 A | 11/1999 | Johnson |
| 5,993,397 A | 11/1999 | Branson |
| 6,025,777 A | 2/2000 | Fuller et al. |
| 6,037,676 A | 3/2000 | Foree |
| 6,067,009 A | 5/2000 | Hozuka et al. |
| 6,104,931 A | 8/2000 | Havinis et al. |
| 6,292,095 B1 | 9/2001 | Fuller et al. |
| 6,295,449 B1 | 9/2001 | Westerlage et al. |
| 6,339,736 B1 | 1/2002 | Moskowitz et al. |
| 6,343,220 B1 | 1/2002 | Van Der Salm |
| 6,370,472 B1 | 4/2002 | Fosseen |
| 6,377,890 B1 | 4/2002 | Doi |
| 6,415,210 B2 | 7/2002 | Hozuka et al. |
| 6,429,773 B1 | 8/2002 | Schuyler |
| 6,435,018 B1 | 8/2002 | Murakami et al. |
| 6,441,732 B1 | 8/2002 | Laitsaari et al. |
| 6,470,732 B1 | 10/2002 | Breton |
| 6,487,478 B1 | 11/2002 | Azzaro et al. |
| 6,525,643 B1 | 2/2003 | Okada et al. |
| 6,571,617 B2 | 6/2003 | Van Niekerk et al. |
| 6,587,040 B2 | 7/2003 | Seto |
| 6,611,740 B2 | 8/2003 | Lowrey et al. |
| 6,612,165 B2 | 9/2003 | Juzswik et al. |
| 6,629,031 B2 | 9/2003 | Gustavsson et al. |
| 6,668,221 B2 * | 12/2003 | Harter, Jr. .............. B60K 35/00 701/36 |
| 6,671,609 B2 | 12/2003 | Nantz et al. |
| 6,691,025 B2 | 2/2004 | Reimer |
| 6,732,031 B1 | 5/2004 | Lightner et al. |
| 6,738,697 B2 | 5/2004 | Breed |
| 6,825,758 B1 | 11/2004 | Laitsaari |
| 6,836,708 B2 | 12/2004 | Tripathi |
| 6,839,614 B1 | 1/2005 | Timko et al. |
| 6,845,314 B2 | 1/2005 | Fosseen |
| 6,847,872 B2 | 1/2005 | Bodin et al. |
| 6,853,853 B1 | 2/2005 | Van Wiemeersch et al. |
| 6,868,358 B2 | 3/2005 | Brown |
| 6,892,052 B2 | 5/2005 | Kotola et al. |
| 6,930,614 B2 | 8/2005 | Rackham et al. |
| 6,937,141 B2 | 8/2005 | Muramatsu |
| 6,983,200 B2 | 1/2006 | Bodin et al. |
| 6,993,421 B2 | 1/2006 | Pillar et al. |
| 7,040,154 B2 | 5/2006 | Shaw et al. |
| 7,053,761 B2 | 5/2006 | Schofield et al. |
| 7,068,158 B2 | 6/2006 | Komatsu et al. |
| 7,092,804 B2 | 8/2006 | McQuade et al. |
| 7,096,101 B2 | 8/2006 | Sonnenrein et al. |
| 7,114,379 B2 | 10/2006 | Emord |
| 7,170,400 B2 | 1/2007 | Cowelchuk et al. |
| 7,171,188 B1 | 1/2007 | Watanabe et al. |
| 7,216,532 B2 | 5/2007 | Rimkus et al. |
| 7,218,209 B2 | 5/2007 | Utter et al. |
| 7,219,063 B2 | 5/2007 | Schalk et al. |
| 7,224,262 B2 | 5/2007 | Simon et al. |
| 7,228,122 B2 | 6/2007 | Oyagi et al. |
| 7,319,378 B1 | 1/2008 | Thompson et al. |
| 7,379,541 B2 | 5/2008 | Iggulden et al. |
| 7,394,352 B2 | 7/2008 | Bell et al. |
| 7,509,849 B2 | 3/2009 | Rutherford et al. |
| 7,778,186 B2 | 8/2010 | Oman et al. |
| 7,783,246 B2 | 8/2010 | Twitchell, Jr. et al. |
| 7,849,149 B2 | 12/2010 | Habaguchi et al. |
| 7,859,392 B2 | 12/2010 | McClellan et al. |
| 8,061,879 B2 | 11/2011 | Simmons et al. |
| 8,089,348 B2 | 1/2012 | Kameyama |
| 8,120,475 B2 | 2/2012 | Iwamoto et al. |
| 8,325,028 B2 | 12/2012 | Schofield et al. |
| 8,502,642 B2 * | 8/2013 | Vitito ..................... H05K 5/0208 340/438 |
| 8,744,678 B2 * | 6/2014 | Becher ................. H04M 1/72577 701/29.7 |
| 8,884,749 B1 * | 11/2014 | Palmer .................. B60K 37/04 340/438 |
| 8,971,927 B2 * | 3/2015 | Zhou ..................... H04W 48/04 455/414.2 |
| 8,994,522 B2 * | 3/2015 | Tengler ................. B60K 35/00 340/439 |
| 9,092,309 B2 * | 7/2015 | MacNeille ............. G06F 17/00 |
| 9,308,920 B2 * | 4/2016 | Konigsberg ........... B60W 50/08 |
| 9,376,018 B2 * | 6/2016 | Aryal ..................... B60K 35/00 |
| 9,460,601 B2 * | 10/2016 | Mimar ................. G08B 21/0476 |
| 9,481,288 B1 * | 11/2016 | Palmer .................. B60K 37/04 |
| 9,545,930 B2 * | 1/2017 | Ricci ................... G01C 21/3484 |
| 2001/0033225 A1 | 10/2001 | Razavi et al. |
| 2002/0130771 A1 | 9/2002 | Osborne et al. |
| 2003/0004741 A1 | 1/2003 | Johnson et al. |
| 2003/0016130 A1 | 1/2003 | Joao |
| 2003/0093218 A1 | 5/2003 | Jones |
| 2003/0158640 A1 | 8/2003 | Weber |
| 2003/0205081 A1 | 11/2003 | Proschka |
| 2003/0208309 A1 | 11/2003 | Tripathi |
| 2004/0050188 A1 | 3/2004 | Richards et al. |
| 2004/0075539 A1 | 4/2004 | Savoie et al. |
| 2004/0112124 A1 | 6/2004 | Sonnenrein et al. |
| 2004/0193368 A1 | 9/2004 | Sanqunetti |
| 2004/0203634 A1 | 10/2004 | Wang et al. |
| 2005/0024189 A1 | 2/2005 | Weber |
| 2005/0137763 A1 | 6/2005 | Watkins et al. |
| 2005/0179518 A1 | 8/2005 | Kawamura |
| 2005/0190900 A1 | 9/2005 | White et al. |
| 2005/0195106 A1 | 9/2005 | Davis et al. |
| 2005/0273218 A1 | 12/2005 | Breed et al. |
| 2006/0036356 A1 * | 2/2006 | Rasin ................... H04M 1/6091 701/1 |
| 2006/0095174 A1 | 5/2006 | Sonnenrein et al. |
| 2006/0142917 A1 * | 6/2006 | Goudy ................... B60K 35/00 701/45 |
| 2006/0208865 A1 | 9/2006 | Quach et al. |
| 2006/0220806 A1 | 10/2006 | Nguyen |
| 2006/0220809 A1 | 10/2006 | Stigall et al. |
| 2006/0220813 A1 | 10/2006 | Utter et al. |
| 2006/0235652 A1 | 10/2006 | Rimkus et al. |
| 2006/0271275 A1 * | 11/2006 | Verma ................... G07C 5/0816 701/532 |
| 2006/0273885 A1 | 12/2006 | Thompson |
| 2006/0288101 A1 | 12/2006 | Mastrodonato et al. |
| 2007/0015548 A1 | 1/2007 | Flick |
| 2007/0027595 A1 | 2/2007 | Nou |
| 2007/0060056 A1 | 3/2007 | Whitaker et al. |
| 2007/0069951 A1 | 3/2007 | Sweet |
| 2007/0155300 A1 | 7/2007 | Hsieh |
| 2007/0156317 A1 | 7/2007 | Breed |
| 2007/0193348 A1 | 8/2007 | Rutherford et al. |
| 2007/0200671 A1 | 8/2007 | Kelley et al. |
| 2007/0229350 A1 | 10/2007 | Scalisi et al. |
| 2007/0290881 A1 | 12/2007 | Nikitin et al. |
| 2008/0024285 A1 | 1/2008 | Vandenbrink et al. |
| 2008/0046149 A1 | 2/2008 | Breed |
| 2008/0077292 A1 | 3/2008 | Gisler |
| 2008/0082221 A1 | 4/2008 | Nagy |
| 2008/0106859 A1 | 5/2008 | Eguchi et al. |
| 2008/0125665 A1 | 5/2008 | Nigam |
| 2008/0129684 A1 * | 6/2008 | Adams ................... B60K 35/00 345/156 |
| 2008/0136611 A1 | 6/2008 | Benco et al. |
| 2008/0140265 A1 | 6/2008 | Hong et al. |
| 2008/0147265 A1 | 6/2008 | Breed |
| 2008/0147271 A1 | 6/2008 | Breed |
| 2008/0172147 A1 | 7/2008 | Taki et al. |
| 2008/0197970 A1 | 8/2008 | Fouts |
| 2008/0204556 A1 | 8/2008 | De Miranda et al. |
| 2008/0215665 A1 | 9/2008 | Appleby et al. |
| 2008/0228355 A1 | 9/2008 | De Jonk et al. |
| 2008/0245598 A1 * | 10/2008 | Gratz ................... B60R 25/1004 180/287 |
| 2008/0266051 A1 | 10/2008 | Taki et al. |
| 2008/0299961 A1 | 12/2008 | Muller et al. |

(56) References Cited

U.S. PATENT DOCUMENTS

| | | |
|---|---|---|
| 2008/0309451 A1 | 12/2008 | Zellweger et al. |
| 2009/0075624 A1 | 4/2009 | Cox et al. |
| 2009/0091437 A1 | 4/2009 | Corniot |
| 2009/0096575 A1 | 4/2009 | Tieman |
| 2009/0096576 A1 | 4/2009 | Oman et al. |
| 2009/0096596 A1 | 4/2009 | Sultan et al. |
| 2009/0102616 A1* | 4/2009 | Stone ............... A63F 13/10 340/309.9 |
| 2009/0098907 A1 | 5/2009 | Huntzicker et al. |
| 2009/0167524 A1 | 7/2009 | Chesnutt et al. |
| 2009/0273438 A1 | 11/2009 | Sultan et al. |
| 2010/0145759 A1 | 6/2010 | Hembury |
| 2010/0168967 A1 | 7/2010 | Dlugoss et al. |
| 2010/0233957 A1 | 9/2010 | Dobosz |
| 2010/0279626 A1* | 11/2010 | Bradley ............. H04W 48/04 455/69 |
| 2011/0015971 A1 | 1/2011 | Hembury |
| 2011/0029875 A1 | 2/2011 | Milch |
| 2011/0071720 A1 | 3/2011 | Schondorf et al. |
| 2011/0071725 A1 | 3/2011 | Kleve et al. |
| 2011/0071734 A1 | 3/2011 | Van Wiemeersch et al. |
| 2011/0080282 A1 | 4/2011 | Kleve et al. |
| 2011/0130945 A1 | 6/2011 | Deedy et al. |
| 2011/0137520 A1* | 6/2011 | Rector ............. H04M 1/72577 701/36 |
| 2011/0205040 A1 | 8/2011 | Van Wiemeersch |
| 2011/0205047 A1 | 8/2011 | Patel et al. |
| 2011/0215901 A1 | 9/2011 | Van Wiemeersch et al. |
| 2011/0230165 A1 | 9/2011 | Kleve et al. |
| 2011/0246026 A1* | 10/2011 | Shuster ............. B60K 37/06 701/36 |
| 2012/0041633 A1* | 2/2012 | Schunder ........... B60K 35/00 701/29.2 |
| 2012/0130604 A1* | 5/2012 | Kirshon ........... F02N 11/0822 701/51 |
| 2013/0030645 A1* | 1/2013 | Divine ............. B60K 35/00 701/36 |
| 2013/0185662 A1* | 7/2013 | Quattrocolo ........ B60K 37/06 715/764 |
| 2014/0163771 A1* | 6/2014 | Demeniuk .......... H04B 1/082 701/2 |
| 2014/0229060 A1* | 8/2014 | MacNeille ........... G06F 17/00 701/36 |
| 2015/0149023 A1* | 5/2015 | Attard ............. B60W 50/10 701/28 |
| 2016/0174132 A1* | 6/2016 | Hynes ............. H04W 4/027 455/418 |
| 2016/0345131 A9* | 11/2016 | Jones ............. H04W 4/027 |

FOREIGN PATENT DOCUMENTS

| | | |
|---|---|---|
| JP | 2005220635 | 8/2005 |
| WO | 2006075533 | 7/2006 |

OTHER PUBLICATIONS

German Office Action, FMC 2913 PUS1 Family, dated Mar. 1, 2013.

J. Smith, Wanted: One Gorilla, printed from www.tirereview.com, Jul. 27, 2009.

Check Tire Pressure with Bluetooth, printed from www.esato.com, Jul. 30, 2004.

Acumine Pty Ltd—Fleet Monitoring System, http://www.acumine.com/_Products/Fleet Monitoring.php., May 22, 2009.

Vehicle monitoring system, GPS vehicle monitoring system. Vehicle tracking system. http://www.guardmagic.com/, May 22, 2009.

911 Assist, Vehicle Health Report Expand Sync Capabilities and Convenience Features, printout from www.media.ford.com.

Vehicle Health Report Delivers Assistance With Vehicle Maintenance and Monitoring, printout from www.media.ford.com.

Solindo GPS, Solindo Web Products: The Solutions Provider Company. Printout from www.solindoweb.com/products.php on Sep. 16, 2009, pp. 1-4.

\* cited by examiner

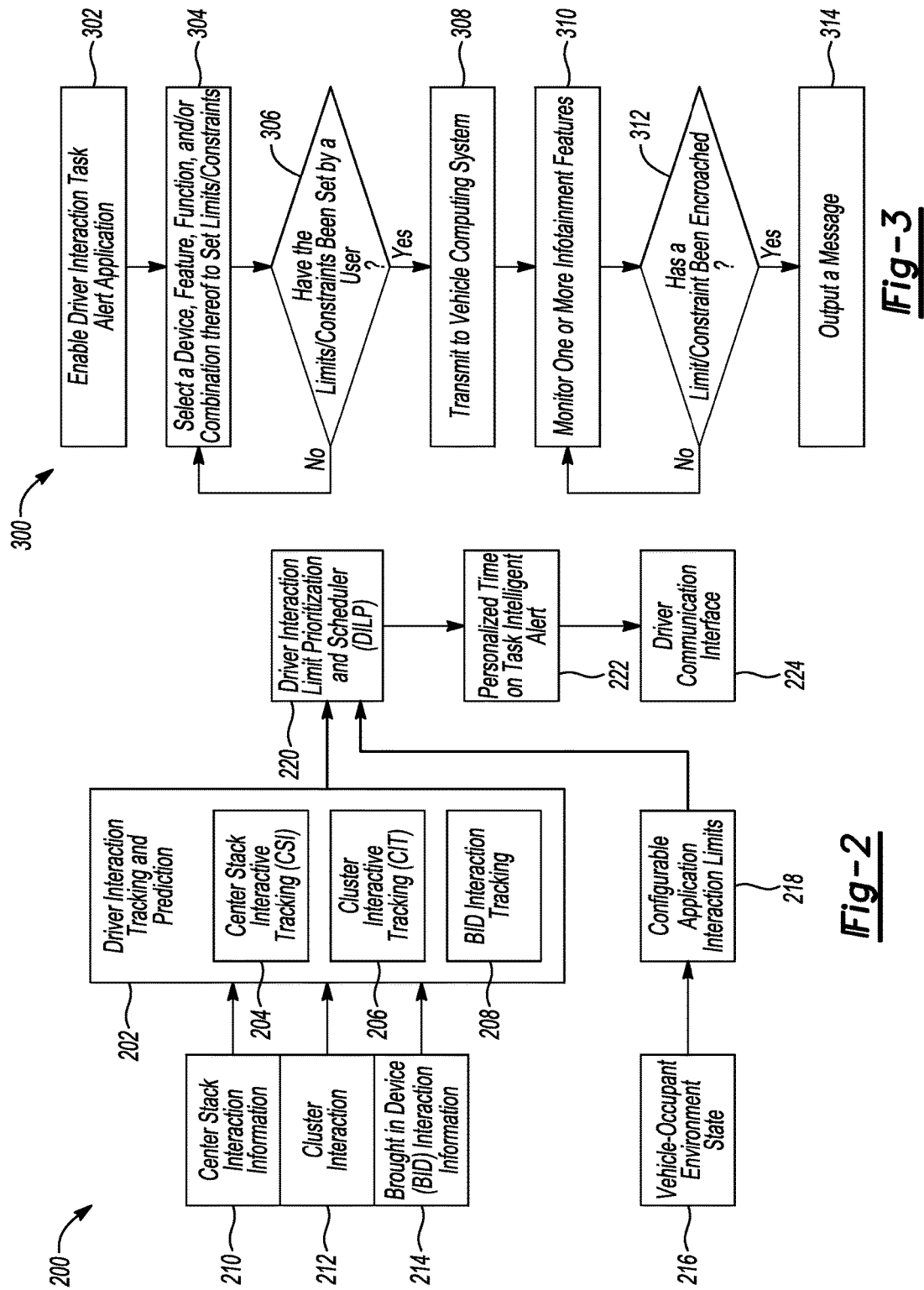

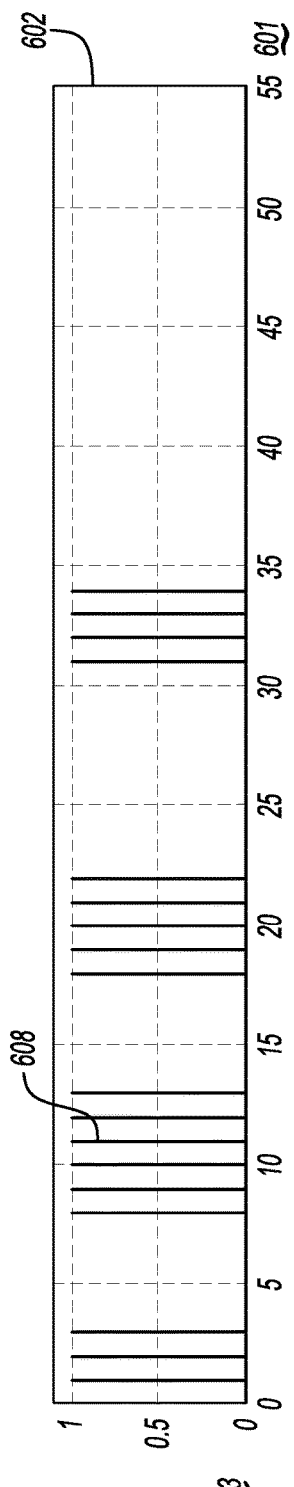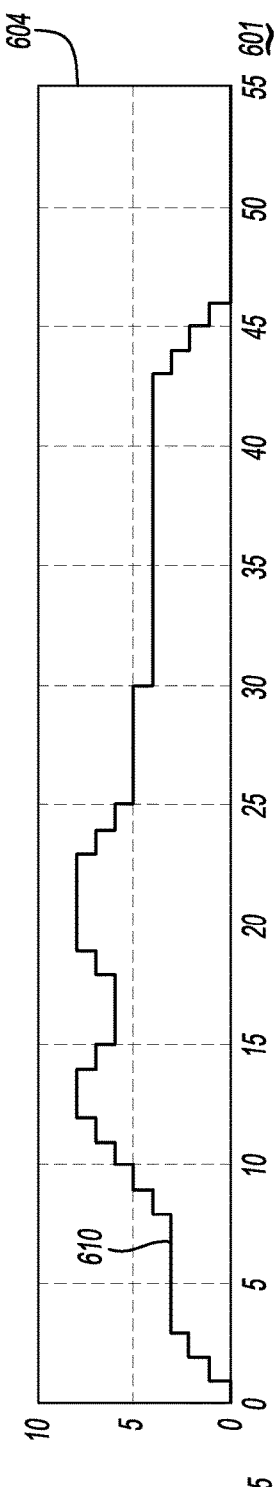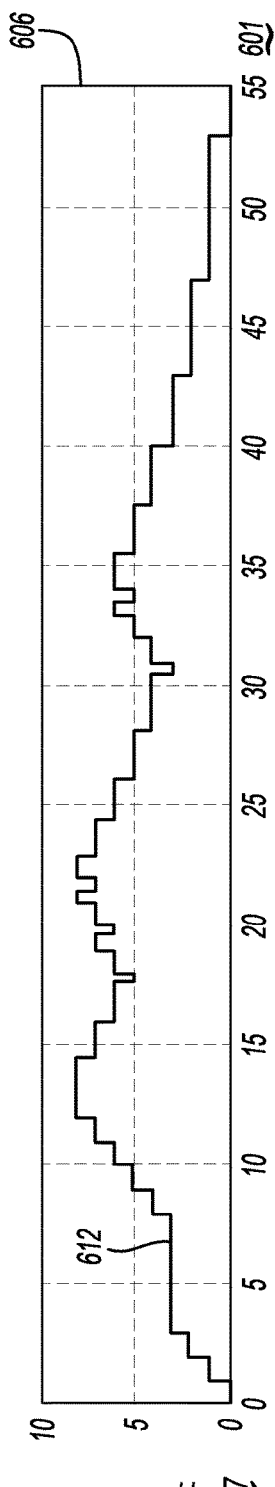

US 10,099,700 B2

METHOD AND SYSTEM FOR DRIVER TAILORED INTERACTION TIME ALERT

TECHNICAL FIELD

The present disclosure generally relates to a driver warning device.

BACKGROUND

U.S. Pat. No. 6,892,116 generally discloses a method for vehicle information and interaction management. The method receives vehicle feature data and driver preference data for a vehicle. In addition, the method also receives an information message from the vehicle and a driving workload estimate that is indicative of current and previously occurring conditions. A control signal responsive to the vehicle feature data, information message, driver preference data and driving workload estimate is provided to initiate the activation or disablement of a function of the vehicle.

U.S. Pat. No. 8,522,320 generally discloses a system for authorizing use of a vehicle communication and information system by receiving information associating one or more devices with a vehicle computer. The system may be configured to receive information identifying a user requesting authorization to command the vehicle controls from the one or more devices associated with the vehicle computer. The user may be authorized to command the vehicle controls from the one or more devices associated with the vehicle computer based on performing an authentication process for authenticating the user, determining that the user is an authenticated user based on the authentication process, and enabling command of one or more vehicle controls from the one or more remote devices via the associated vehicle computer based on the user being authenticated.

U.S. Patent Application 2007/0013498 generally discloses a driver warning device which serves to warn the driver when a safety-critical condition of the vehicle is reached. A warning is issued only if such issuance is to take place in accordance with a user profile. This avoids unnecessary warnings from being issued to a driver, which could reduce the acceptance of the warning system on the part of the driver.

SUMMARY

In at least one embodiment, a vehicle comprising at least one controller in communication with a transceiver, and the transceiver capable of communication with one or more infotainment devices. The at least one controller may be configured to receive a configurable constraint for the one or more infotainment devices. The at least one controller may be further configured to monitor an interaction between a driver and the one or more infotainment devices based on the configurable constraint. The at least one controller may be further configured to generate an alert if the configurable constraint is exceeded in the interaction.

In at least one embodiment, a computer-program product embodied in a non-transitory computer read-able medium that is programmed for communicating infotainment feature data to one or more controllers for at least one of audio playback and display. The computer-program product may comprise instructions for receiving a configurable constraint for an infotainment device. The computer-program product may comprise additional instructions for monitoring an interaction between a driver and the infotainment device based on the configurable constraint. The computer-program product may comprise additional instructions for generating an alert if the configurable constraint is exceeded in the interaction.

In at least one embodiment, a nomadic device comprising at least one controller in communication with a transceiver and the transceiver is capable of communication with a vehicle computing system. The at least one controller may be configured to establish communication with the vehicle computing system and execute an application that manages infotainment device interaction at the vehicle computing system. The at least one controller may be further configured to receive one or more inputs to set a configurable constraint for the infotainment device interaction and transmit the configurable constraint to the vehicle computing system. The configurable constraint may include one or more limits to monitor an interaction between a driver and the infotainment device in a vehicle.

BRIEF DESCRIPTION OF THE DRAWINGS

FIG. 2 is a block diagram of a driver interaction time-on task alert system according to an embodiment;

FIG. 3 is a flow chart illustrating a nomadic device communicating one or more driver interaction time-on task parameters to the vehicle computing system according to an embodiment;

FIG. 6A-6C are graphs illustrating the monitoring of driver interaction with the one or more infotainment devices of the vehicle computing system using the driver interaction time-on task alert system according to an embodiment.

DETAILED DESCRIPTION

Figure 1:
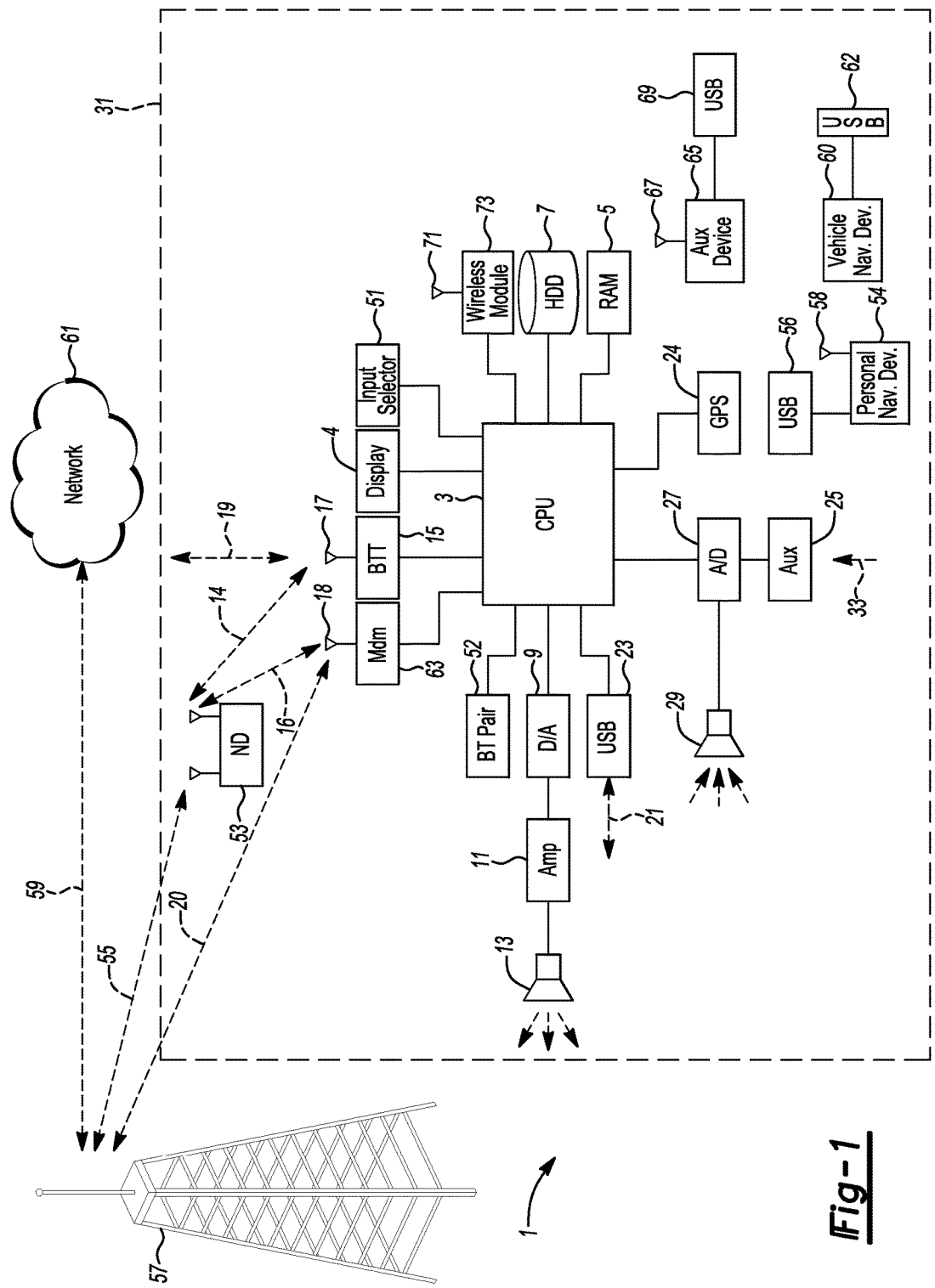
FIG. 1 is a block diagram of a vehicle infotainment system implementing a user-interactive vehicle information display system according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

A driver may be provided with interactive interfaces for one or more infotainment devices (or referred to as infotainment features) of the vehicle computing system that may include, but is not limited to, vehicle information, media content, entertainment information, and connected telematics services and applications received from a brought in mobile device. The one or more infotainment devices are provided to the driver within the vehicle-cabin for a convenient and efficient driving experience. However, the dynamic conditions associated with driving might require timely tracking of the driver's interaction of the one or more infotainment devices to avoid potential driver inattention.

This disclosure provides a method and system to intelligently tailor an alert/reminder to the driver if relatively increased interactions (e.g., center stack touch screen interactions) are engaged. The alert is provided based on several factors including, but not limited to, the vehicle, driver, environment conditions, and/or the interactive application/feature configurable constraints. The disclosed method and system may include, but is not limited to, a driver alert/reminder about time limits/constraints while interacting with built-in interface applications and brought in infotainment devices that may cause driver inattention over a period of time. The disclosed method and system may also include cluster interactive tracking, center stack interactive tracking, brought-in device interactive tracking, and a measure of the vehicle, occupant, and environment conditions for decision-making on when to alert the driver that he/she has exceeded an interaction limit of the one or more infotainment devices.

The method and system to monitor driver interaction of the one or more infotainment devices may include the option of allowing for a personalized driver alert and/or a reminder about time limits and constraints for interacting with built-in interface applications and brought in technology while driving. This disclosure may allow for a configurable alert system to determine driver inattention based on cluster interactive tracking, center stack interactive tracking, brought-in device interactive tracking, and a measure of the vehicle, occupant, and environment conditions for decision-making on when to alert the driver of exceeding an interaction limit.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

FIG. 2 is a block diagram of a driver interaction time-on task alert system 200 according to an embodiment. The driver interaction time-on task alert system 200 may have one or more controllers (i.e., processors) configured to monitor driver interaction tracking and prediction of the one or more infotainment features (also known as infotainment devices). The one or more controllers may be in communication with the VCS network. The system may include a drive interaction tracking and prediction module 202 to monitor the one or more infotainment devices including, but not limited to, center stack interactive (also known as CSI) tracking 204, cluster interactive tracking 206 (also known as CIT), and/or brought-in device (also known as BID) interaction tracking 208.

The driver interaction tracking and prediction module 202 may receive center stack interaction information 210. The center stack interaction information 210 may include, but is not limited to, control and management of the one or more infotainment devices/features. For example, the center stack interactive tracking 210 may include, but is not limited to, climate control, audio entertainment control, power window control, seat adjustment control, and/or navigation control. The control and management of the one or more devices may be accomplished with the driver's use of a touch screen display, one or more selector knobs, and/or hard button controls. Based on the received interactive information, the driver interaction tracking and prediction module 202 may comprise an algorithm executed on hardware communicating within the VCS to enable center stack interactive tracking 204.

The driver interaction tracking and prediction module 202 may receive cluster interaction information 212 including, but not limited to, driver interaction with wiper control, steering wheel controls, and/or turn indicator control. The cluster interaction information 212 may be received at the driver interaction tracking and prediction module 202. The driver interaction tracking and prediction module 202 may comprise an algorithm executed on hardware communicating within the VCS to enable cluster interactive tracking 206.

The driver interaction tracking and prediction module 202 may receive brought-in device interaction information 214 comprising of the driver interaction of one or more applications/features/devices on the mobile device including, but not limited to, streaming internet radio, communicating social media posts/feeds, and/or navigation information. For example, the driver may interact with their mobile device while in the vehicle to enable one or more applications executed on the mobile device (also referred to as a nomadic device). The interaction may include, but is not limited to, managing applications executed at the mobile device, answering phone calls, and/or viewing text messages and emails. The brought-in device interaction information 214 may be received by the driver interaction tracking and prediction module 202. The driver interaction tracking and prediction module 202 may comprise an algorithm executed on hardware communicating within the VCS to enable brought-in device interaction tracking 208.

The driver interaction tracking and prediction module 202 may transmit the monitored tracking information to a driver interaction limit prioritization and scheduler module 220. The driver interaction limit prioritization and scheduler module 220 may determine driver inattention based on driver interaction tracking and prediction information 202, configurable application interaction limits 218, vehicle-occupant environment state 216, and/or a combination thereof.

The vehicle-occupant environment state module 216 may measure environmental conditions, vehicle characteristics, and/or occupant driving characteristics. The environmental conditions may include, but is not limited to, traffic density, road construction, weather, and/or road conditions (e.g., wet, slick, or dry). The environmental conditions may be calculated and received by the vehicle-occupant environment state module 216 by using one or more components in communication with the VCS.

For example, the vehicle-occupant environment state module 216 may receive traffic density data from a navigation system in communication with the VCS. In another example, the vehicle-occupant environment state module 216 may receive weather data from a weather application being executed at a nomadic device in communication with the VCS or being received from a website in communication with a modem embedded within the VCS.

The vehicle characteristics may include, but is not limited to, vehicle speed, throttling, braking, acceleration, accelerator pedal position, and/or driver steering wheel input. The vehicle characteristics may be calculated and received by the vehicle-occupant environment state module 216 by using one or more components in communication with the VCS. For example, the pedal position may be recorded by a powertrain control module in communication with the VCS using the CAN Bus and transmitted to the vehicle-occupant environment state module 216.

The occupant driving characteristics may determine how the driver is operating the vehicle based on one or more components being measured by the VCS. In another embodiment, the occupant driving characteristics may be determined with the use of an interior camera and/or sensor(s) monitoring the driver's movement. The occupant driving characteristics may be calculated and received by the vehicle-occupant environment state module 216 by receiving information from one or more components in communication with the VCS.

The driver interaction time-on task alert system 200 may include a configurable application interaction limits module 218 to monitor the driver's interaction of the one or more infotainment devices. The configurable application interaction limits module 218 may comprise one or more predefined tables having several factors to determine a driver's interaction of one or more infotainment devices. The one or more predefined tables may monitor a driver interaction with an infotainment device based on a configurable constraint within a predetermined time window. The one or more predefined tables include configurable constraints that may be selected based on one or more variables received from the vehicle-occupant environment state module 216. The configurable constraint may be a defined number of driver interactions (i.e., touches) of one or more infotainment devices. The configurable constraint may be measured based on a predetermined time window. For example, the configurable constraints in the one or more tables may include a predetermined shorter time window and/or lower amount of driver interactions based on environmental conditions that include wet or slick road conditions.

For example, if the vehicle-occupant environmental state module 216 determines that the road conditions are hazardous (e.g., wet or slick) a configurable constraint monitoring driver interaction may go from a predetermined setting of three number of touches within a time window of six seconds, to a predetermined setting of two number of touches within a time window of twelve seconds. The environmental condition increases the restriction of the driver interacting with the one or more infotainment devices.

The one or more predefined tables may be configured to include the one or more variables being received from the vehicle-occupant environment state module 216 as factors to determine driver interaction of one or more infotainment devices. For example, a user may select one or more environmental conditions, vehicle characteristics, and/or occupant driving characteristics to determine how many number(s) of touches a driver may interact with the one or more infotainment devices before transmitting an alert. The number of touches may include, but is not limited to, adjusting knobs, switches, and/or hard button controls. The number of touches may also include, touch screen selections, touch screen taps to interact with features/functions/devices, and/or voice commands. As specified in Table 1 below, a user may configure one or more tables based on several factors as shown below:

TABLE 1

| Environmental Conditions | Vehicle Characteristics | Number of Touches | Alert |
|---|---|---|---|
| Sunny/Dry Roads | 35 MPH | 2 touches/ 6 seconds | 3 or more touches in 6 seconds |
| Snowing/Slick Roads | 55 MPH | 2 touches/ 12 seconds | 3 or more touches in 12 seconds | wherein the variables may include environmental conditions monitoring weather and road condition factors, vehicle characteristics monitoring vehicle speed, and the number of touches received from the driver. Based on the one or more variables selected in the predefined table, the driver interaction time-on task alert system 200 may send an alert to the driver notifying him/her that they may be in violation. The driver interaction time-on task alert system 200 notifies a driver based on the one or more variables to improve driver attention. The preconfigured table shown in Table 1 may be defined by a user on a mobile device, external computer in communication with the VCS through a server connection, and/or at a user interface display of the VCS in the vehicle. The mobile device may transmit the one or more preconfigured tables using wireless communication including, but not limited to, Bluetooth, Bluetooth low energy, and/or WiFi.

The driver interaction limit prioritization and scheduler module 220 may receive data from the driver interaction tracking and prediction module 202 to monitor driver inattention based on the configurable application interaction limits 218. The data is associated with the monitoring of the driver interacting with the one or more infotainment devices. The driver interaction limit prioritization and scheduler module 220 may compare the data to the one or more predefined tables having the configurable application interaction limits. If one or more interaction limits are encroached, The personalized time on task intelligent alert module 222 may be customized by a user to provide remedial actions based on the encroachment of the one or more predefined tables (e.g., as shown in Table 1). The remedial actions may include, but is not limited to, blocking phone calls, blocking text messages, blocking social media interaction, and/or blocking control of one or more infotainment devices. As specified in Table 2 below, a user may configure one or more remedial action tables based on an encroachment of at least one predefined variable as shown below:

TABLE 2

| Number of Touches | Alert | Device | Remedial Action |
| --- | --- | --- | --- |
| 2 touches/ 6 seconds | 3 or more touches in 6 seconds | Mobile Device Phone Calls | Block Phone Calls - VIP List |
| 2 touches/ 12 seconds | 3 or more touches in 12 seconds | Center Stack Audio Entertainment Controls | Block Control |
| 3 touches/ 9 seconds | 4 or more touches in 9 seconds | Cluster Interaction Navigation Controls | Block Control | wherein the remedial actions may include variables from one or more predefined tables (e.g., as shown in Table 1), a device in communication with the VCS, and a configurable remedial action. For example, if the system detects that the mobile device has exceeded the predefined interaction limit of three or more touches in a six second time window, the system may then prevent phone calls being received at the device. In another example, the remedial action may be implemented at all times based on the recognized driver (e.g., teenage driver). The configurable remedial action may be configured to allow for certain phone numbers to be received at all times. For example, the remedial action may include a very important person list configured to allow for phone calls to be received at all times from mom, dad, boss and wife.

The remedial action table as shown in Table 2 may be defined by a user on a mobile device, external computer in communication with the VCS through a server connection, and/or at a user interface display of the VCS in the vehicle. In response to the remedial action table(s), the personalized time on task intelligent alert module 222 may transmit one or more messages to a driver communication interface 224.

The driver communication interface module 224 may transmit one or more messages using a text message at a display screen, using a voice message output at a speaker, and/or having haptic devices such as a vibrating steering wheel, and/or seat. For example, the text message may warn the driver that they one or more infotainment devices may be locked out based on an encroachment of the predefined variable that determines driver inattention. In another example, the haptic device may vibrate the steering wheel such that the driver knows that there may be an encroachment of one or more predefined variables monitoring driver inattention.

FIG. 3 is a flow chart illustrating a nomadic device communicating one or more driver interaction time-on task parameters to the VCS according to an embodiment. The nomadic device may be a wireless mobile device communicating with the VCS using short range wireless technology or may be an embedded communication module (e.g., onboard modem) within the VCS. The embedded communication module within the VCS may include, but is not limited to, an embedded cellular module, WiFi module, or combination thereof. The method may be implemented using software code contained and executed using hardware within the VCS, nomadic device, and a server. In other embodiments, the method 300 may be implemented in one or more CPUs in the VCS, or distributed amongst multiple controllers (e.g., one or more processors) in communication with the nomadic device.

Referring again to FIG. 3, the VCS and its components illustrated in FIG. 1, and FIG. 2 are referenced throughout the discussion of the method 300 to facilitate understanding of various aspects of the present disclosure. The method 300 of monitoring driver interaction of the one or more infotainment devices may include the option of allowing for a personalized driver alert and/or a reminder about time limits and constraints for interacting with built-in interface applications and brought in technology while driving. The method 300 of configuring and managing the one or more configurable constraints may be transmitted to the VCS and implemented through a computer algorithm, machine executable code, or software instructions programmed into a suitable programmable logic device(s) of the vehicle, such as the vehicle control module, the driver interaction tracking and predication module, driver interaction limit prioritization and scheduler module, another controller in communication with the vehicle computing system, or a combination thereof. Although the various operations shown in the flowchart diagram 300 appear to occur in a chronological sequence, at least some of the operations may occur in a different order, and some operations may be performed concurrently or not at all.

In operation 302, a user may enable a driver interaction task alert application at the nomadic device. The driver interaction task alert application may be downloaded at an original equipment manufacturer website. The driver interaction task alert application may be executed on hardware at the nomadic device. For example, the user may download the application at their mobile phone such that they may remotely configure one or more predefined tables for transmittal to the VCS.

In operation 304, the user may select a device, feature, function and/or combination thereof to define at least one variable for monitoring driver interaction of the one or more infotainment devices. For example, the user may configure audio entertainment driver interaction to define one or more variables to monitor driver's use of the audio entertainment system. The one or more variables may include, but not limited to, number of selections within a defined time window, volume control, and/or combination thereof.

In operation 306, the application may determine if the limit/constraint of the predefined table has been set by the user. If the one or more limits/configurations are set, the nomadic device may transmit the one or more preconfigured tables including the limit/constrain in operation 308.

In operation 310, the VCS may monitor the one or more infotainment devices based on the one or more predefined tables. The system may determine if a limit/constraint has been encroached based on monitoring the one or more infotainment devices. If a limit/constraint is encroached based on driver's interaction of the one or more infotainment devices, the VCS may output a message. The message may be a voice, text, and/or haptic message. The VCS may transmit the message to one or more components including, but not limited to, a nomadic device connected to the VCS, display screen and speakers, and/or a server in communication with the VCS.

Figure 4:
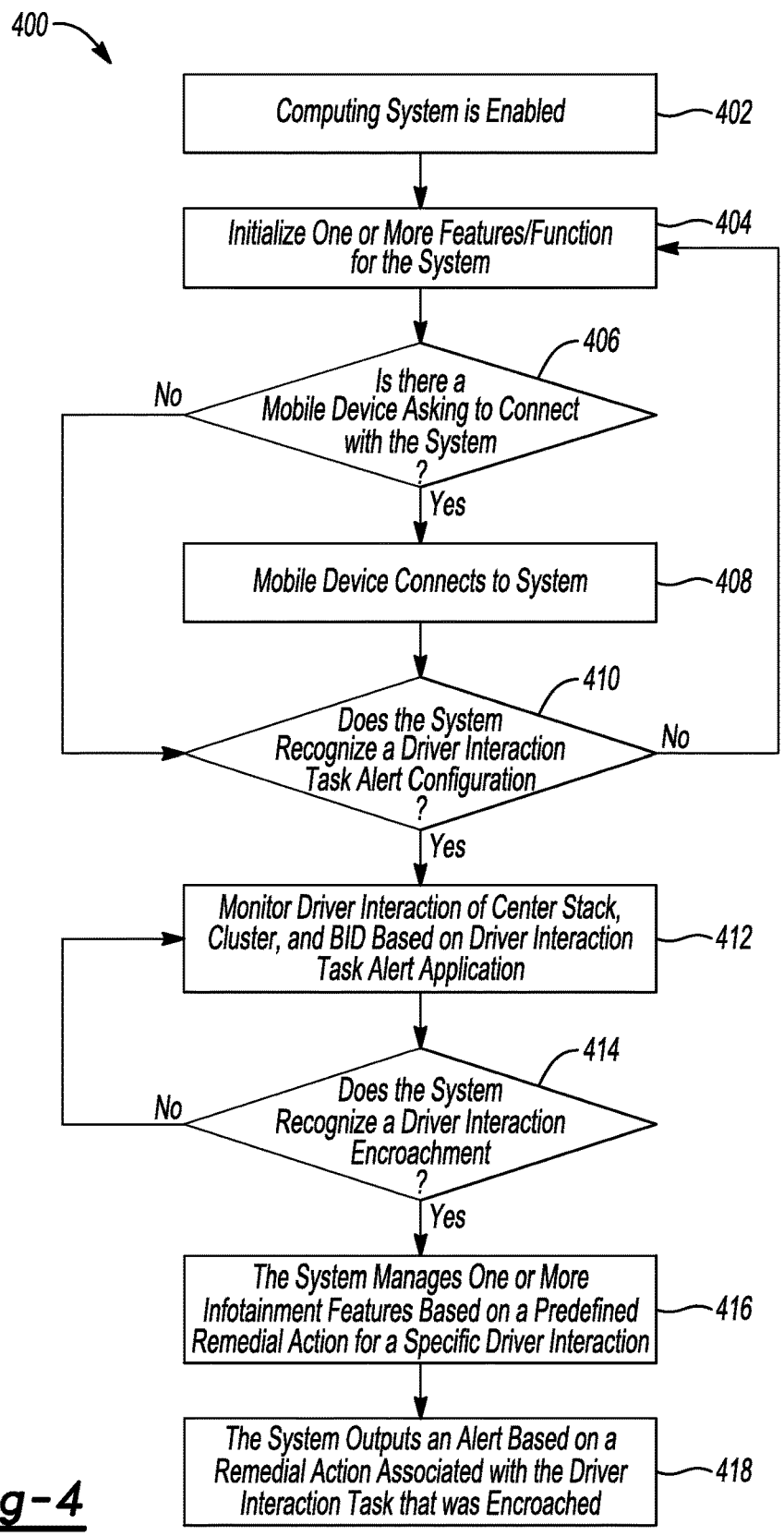
FIG. 4 is a flow chart illustrating the vehicle computing system managing the driver interaction time-on task alert system according to an embodiment.

FIG. 4 is a flow chart 400 illustrating the VCS managing the driver interaction time-on task alert system according to an embodiment. The VCS may mange the driver interaction time-on task alert system using one or more controllers in communication within a vehicle network. The vehicle network may include a CAN Bus network, a wireless network, and/or a combination thereof.

In operation 402, the VCS may be enabled based on a driver request to start the system (e.g., key-on of ignition). The VCS may initialize the one or more infotainment features in communication with the system in operation 404.

In operation 406, the VCS may detect the mobile device (i.e., nomadic device) requesting to connect with the system. The VCS may establish a connection with the mobile device using wireless and/or wired communication in operation 408.

The VCS may execute a driver interaction task alert application being request by the system. The VCS may receive one or more driver interaction task alert application configurations from the connected mobile device and/or from a memory location of at least one controller in the VCS network in operation 410.

In operation 412, the VCS may monitor driver interaction of the center stack, instrument cluster, and brought in device (i.e., mobile device) based on the driver interaction task alert application being executed on hardware within the VCS. The VCS determines if a driver interaction encroachment has occurred based on the driver interaction task alert configurations in operation 414.

In operation 416, in response to the system recognizing a driver interaction encroachment, the VCS may manage one or more infotainment features based on a predefined remedial action for a specific driver interaction. The predefined remedial actions may be configured by a user at the mobile device, at a remote computer in communication with the VCS through a server, and/or in the vehicle using the center stack controls. The VCS may output an alert if based on the remedial action associated with the driver interaction task that was encroached in operation 418.

Figure 5:
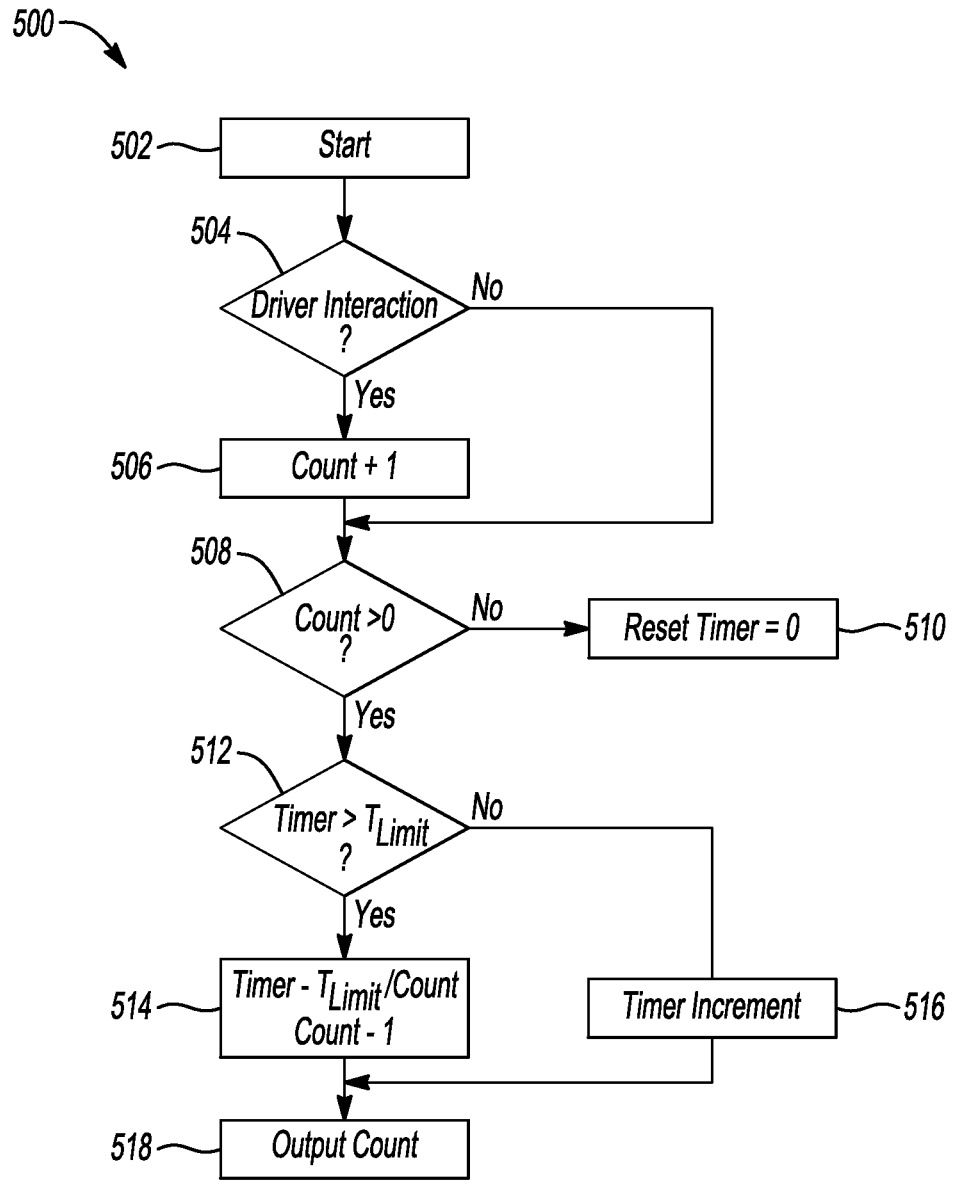
FIG. 5 is a flow chart illustrating the driver interaction time-on task alert system monitoring driver interface with one or more infotainment devices of the vehicle computing system according to an embodiment.

FIG. 5 is a flow chart illustrating the driver interaction time-on task alert system monitoring driver interface with one or more infotainment devices of the vehicle computing system according to an embodiment. The driver interaction time-on task monitoring system may be configured based on the one or more predefined tables having driver incidents (i.e., interaction) limits measured within a time window. The time window may be configured and defined based on variables from the vehicle occupant environment state module and/or the configurable application interaction limits module.

In operation 502, the driver interaction time-on task alert system may initialize during a VCS start-up mode and/or when the application is requesting execution. The initialization may include the reset of a measured time window and/or measured number of touch count values associated with the driver's interaction of the one or more infotainment features. Once initialized, the system may begin to monitor the driver interaction in operation 504.

In operation 506, if the system detects that the driver is interacting with one or more infotainment features, the system may begin to monitor the number of touches received by the driver by incrementing the driver number of touch count with each interaction (i.e., incident). The system may begin to increment a configurable timer window once the system observes a driver interaction (e.g., touch of one or more controls associated with the one or more infotainment devices/features) in operation 508.

In operation 510, if no driver interaction is observed by the system, the configurable timer window is reset to an initial count. The system may begin to increment the time window to start monitoring the number of driver interactions (i.e., incidents) within the configurable time window in operation 512.

In operation 514, if the time window has exceeded the configurable time window, the system may reduce the timer value by a fraction of its value. The timer value is reduced by the expected time between the first and the second touch within the time window. This configurable time window allows the output to be a real number of driver interaction count value and improves memory efficiency of the one or more controllers, unlike a circular buffer.

In operation 516, if the time window has not exceeded the configurable time window, the system may increment the timer such that the number of touches count value may increase if the system detects another driver interaction of the one or more infotainment devices.

In operation 518, the counter may output the driver number of touch count value and the time window value such that the driver interaction limit prioritization and scheduler may respond with one or more alert messages. The one or more alert messages may include, but is not limited to, a remedial action response taken by the system.

FIG. 6A-6C are graphs illustrating the monitoring of driver interaction with the one or more features of the vehicle computing system using the driver interaction time-on task alert system according to an embodiment. The driver interaction time-on task monitoring system may improve memory efficient by implementing an interactive tracking method as shown in FIG. 6A-6C.

FIG. 6A depicts a graph 602 having an x-axis 601 representing time in seconds and a y-axis 603 representing a count of an incident 608 (i.e., a touch of the one or more infotainment features). The incidents 608 are generated by simulation to model the driver interaction with the one or more infotainment features. For example, the system may detect an incident 608 if the driver interacts with the touch screen.

FIG. 6B depicts a graph 604 having an x-axis 601 representing time in seconds and a y-axis 605 representing a circular buffer count 610. The circular buffer count 610 is an array of buffer memory that registers all incidents within predefined windows (e.g., a configurable window). For example, a 50 Hz system with a twelve seconds predefined window may require six hundred memory locations to record the incidents monitored by the system. The array of buffer may then reset in a "circular" fashion to achieve a moving window. The circular buffer count 610 approach may represent an enhanced count of the driver interaction with the one or more infotainment features. However, it may require the most memory locations and may not be easy to re-configure.

FIG. 6C depicts a graph 606 having an x-axis 601 representing time in seconds and a y-axis 607 representing the approximate count 612. The approximate count 612 is the counting result from an improved counter method for the driver interaction time-on task alert system monitoring driver interface with one or more infotainment features. This approach may require at least two memory locations, one for the counter, and another one for the timer. The improved counter method may reduce the memory requirement and is easy to re-configure for any window size. FIG. 6C illustrates the improved counter method may approximate the counts of driver interaction compared to the circular buffer count 610.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
a processor configured to:
receive a plurality of user-configurable use-constraints, defining permissible device interaction under differing vehicle-detectable driving conditions, for a connected mobile device;
select a use-constraint, based on vehicle-detected driving conditions, from the plurality of use-constraints;
monitor driver interaction with the device, during a monitoring time window, to determine if an alert should be generated based on violation of permissible interaction defined by the selected use-constraint; and
reset the monitoring time window if no interaction is detected for a threshold time period.

2. The vehicle of claim 1, wherein the at least one controller is further configured to:
detect a change in driving conditions; and
select a new use-constraint from the plurality of use-constraints based on the change in driving conditions.

3. The vehicle of claim 1, wherein the alert includes at least one of voice, visual, and haptic.

4. A non-transitory computer readable storage medium storing instructions that, when executed, cause a processor to perform the method comprising:
receiving a user-configurable use-constraint, including permissible interaction volume over a specified time period, for a device interface of a device wirelessly connected to a vehicle;
monitoring driver interaction with the interface, to determine if an alert should be generated based on the permissible interaction volume being exceeded in less than the specified time period; and
resetting a monitoring time window, defining a duration of driver interaction monitoring, if no interaction is detected for a threshold time period.

5. The computer-program product of claim 4, wherein the monitoring includes monitoring the interface for a number of touch inputs received within the specified time period.

6. The computer-program product of claim 4, to the method further comprising:
receiving an environmental state; and
adjusting the user-configurable use-constraint based on the environment state.

7. The computer-program product of claim 4, wherein the alert includes at least one of voice, visual, and haptic.

8. A system comprising:
a vehicle-based processor configured to:
select a user-configurable constraint defining user-interaction limits for an HMI of a device wirelessly connected to a vehicle including the processor;
receive weather conditions;
select a new user-configurable constraint defining new user-interaction limits based on the weather conditions; and
monitor driver interaction with the device HMI to determine if an alert should be generated based on the interactions exceeding the user-configurable constraint during a predetermined time-window.

\* \* \* \* \*